United States Patent
Davis

(10) Patent No.: US 7,081,197 B1
(45) Date of Patent: Jul. 25, 2006

(54) STEP APPARATUS

(76) Inventor: Stephen James Davis, 1468 Wynnum Road, Tingalpa, Queensland 4173 (AU)

( * ) Notice: Subject to any disclaimer, the term of this patent is extended or adjusted under 35 U.S.C. 154(b) by 0 days.

(21) Appl. No.: 09/446,951

(22) PCT Filed: Jun. 30, 1998

(86) PCT No.: PCT/AU98/00502

§ 371 (c)(1),
(2), (4) Date: Feb. 28, 2000

(87) PCT Pub. No.: WO99/01303

PCT Pub. Date: Jan. 14, 1999

(30) Foreign Application Priority Data

Jun. 30, 1997 (AU) .................................. P07619

(51) Int. Cl.
*B60D 1/60* (2006.01)
(52) U.S. Cl. ..................... 208/507; 280/511
(58) Field of Classification Search ............. 280/415.1, 280/507, 511, 495, 504, 432, 163, 164.1; 224/519, 521, 527; 293/117, 120; D12/203
See application file for complete search history.

(56) References Cited

U.S. PATENT DOCUMENTS

| | | | | |
|---|---|---|---|---|
| 3,394,947 A | * | 7/1968 | Strube | 280/166 |
| 3,507,515 A | * | 4/1970 | Brammer | 280/166 |
| 3,580,613 A | * | 5/1971 | Northrop | 280/500 |
| 3,716,254 A | * | 2/1973 | Tarvin | 280/166 |
| 4,844,498 A | * | 7/1989 | Kerins et al. | 280/504 |
| 4,846,487 A | * | 7/1989 | Criley | 280/166 |
| D315,134 S | * | 3/1991 | Springer | D12/203 |
| 5,332,250 A | * | 7/1994 | Thorwall et al. | 280/507 |
| D370,452 S | * | 6/1996 | Beasley | D12/203 |
| 5,584,495 A | * | 12/1996 | Mason | 280/507 |
| 5,829,774 A | * | 11/1998 | Klemp | 280/507 |
| 5,839,744 A | * | 11/1998 | Marks | 280/416.1 |

FOREIGN PATENT DOCUMENTS

GB         2242659    * 10/1991    .............. 280/164.1

* cited by examiner

*Primary Examiner*—Michael Cuff
(74) *Attorney, Agent, or Firm*—Shoemaker and Mattare

(57) ABSTRACT

There is provided step apparatus comprising a mounting plate (60) colocated with a pintle hook assembly (61) of a vehicle. The mounting plate (60) has an upper extension (65) having formed thereon a pair of spaced lugs (66) adapted to mount a step assembly (67) comprising a moulded step member (70) secured to a step member support (72) having a pair of spaced pivot lugs (73). The step assembly is pivotally mounted to the spaced lugs (66) by pivot pin (74). The spaced lugs (66) are configured having an upper bearing surface (75) whereby in use the underside of the step member support (72) may bear thereon to take at least part of the step loads. The dimensions and configuration of the spaced lugs (66), mounting plate (60) and step member support (72) are selected whereby the raising limit of the step assembly (67) is defined by the bearing of the rear edge of the step member support (72) on the upper edge of the upper extension (65).

4 Claims, 4 Drawing Sheets

STEP APPARATUS

This invention relates to step apparatus.

This invention has particular but not exclusive application for step apparatus to allow easier access to the rear of tray-back utility vehicles and for illustrative purposes reference will be made to such application. However, it is to be understood that this invention can be used in other applications such as providing steps on the rear of vehicles generally.

In the use of utility vehicles, it is common that the operator must stand on the bumper bar or towing hitch in order to reach into the trayback. The towing hitch is, with hitch ball installed, a curved surface, often greasy, which is not a safe support for standing. Where the ball is removed, the hitch is of limited dimension, may also be greasy and generally does not form a safe step.

The present invention aims to alleviate at least one of the foregoing disadvantages and to provide step apparatus which will be reliable and efficient in use.

With the foregoing and other objects in view, this invention in one aspect resides broadly in step apparatus including:

a mounting portion adapted to engage a vehicle in the region of the towing hitch; and a step portion supported on said mounting portion.

The mounting portion may take any suitable form dictated by the form of towing hitch and its environs on the vehicle. Preferably, the mounting portion is secured to the vehicle by the hitch assembly or a portion thereof, whereby the step apparatus may be affixed to existing vehicles. Alternatively, the mounting portion may be formed integrally with the vehicle or hitch assembly.

The mounting portion may comprise a metal or reinforced plastic mounting member or complementary section to the tubular box section Hayman Reece hitch mount provided on heavier utilities and four wheel drive vehicles, as well as some sedans. Alternatively, the mounting portion may comprise a body member having a threaded stud adapted to engage the hitch ball aperture in a conventional gooseneck. In a yet further embodiment of the invention, the mounting means may comprise a body member adapted to engage the hitch ball of the towing hitch.

In a yet further embodiment of the invention, the mounting means may be adapted to secure to the ultimate mounting point of any of the aforementioned hitching arrangements. For example, some hitched comprise a bolted up arrangement at the rear of the vehicle. In these cases, the mounting means may comprise a mounting flange adapted to be bolted through as the hitch assembly is itself mounted.

In the case of the complementary portion adapted to engage the heavy duty towing hitch mount of a utility or four wheel drive, the complementary portion is preferably provided with a transverse aperture or tube adapted to register with the locking pin holes in the vehicle hitch mount whereupon the body member may be locked into engagement therewith with the standard pin otherwise used to engage the removable towing hitch.

In the case of the apparatus adapted to engage the hitch ball, the body portion may comprise a socket or the like adapted to pass over the towing hitch ball, preferably extending down to bear squarely on the gooseneck. The socket is preferably associated with interengagement means adapted to secure the socket on the hitch ball. The lower end of the body portion may be adapted to pass down the sides of the gooseneck whereupon the apparatus may be locked in position beneath the gooseneck by a locking pin or the like.

The step portion may be integrally formed with the mounting portion or may be separable therefrom. For example, the step portion may be integrally formed of moulded plastics with the mounting portion. Alternatively, the step portion may be bolted to the mounting portion, or in the case of metal assemblies may be welded thereto. As a yet further alternative, the step portion and mounting portion may be integrally cast or moulded in metal or plastic.

The step portion may comprise a closed step surface. Alternatively, the step portion may comprise an open grate or the like, in order to reduce the likelihood of slippage due to mud.

The mounting means may be secured to the vehicle or hitch assembly and support the step portion in a position which renders the hitch assembly inoperable. For example, the step portion may be selectively secured to the mounting portion, whereby in use the step portion prevents attachment or detachment of a hitched towable vehicle. The selective securing of the step portion to the mounting portion may be by any suitable means providing the requisite security, such as securing means lockable by padlock.

The step portion may be mounted to the mounting portion in a manner permitting the step- to be moved from an in-use position to a stowed position. For example, the step portion may be hinged to the mounting portion whereby the step portion may be moved from an in use position where the step is disposed above the vehicle hitch to a stowed position whereby the hitch may be undone. In addition, or in the alternative, the step portion may be removable from the mounting portion when not in use.

In order that this invention may be more readily understood and put into practical effect, reference will now be made to the accompanying drawings which illustrate a preferred embodiment of the invention and wherein.

Figure 1:
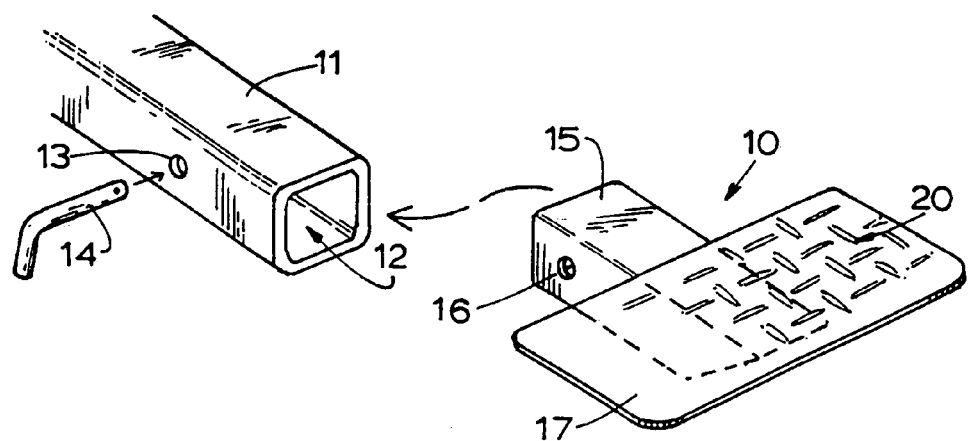
FIG. 1 is an exploded view of a first embodiment of the present invention.

In FIG. 1 there is provided a step apparatus 10 adapted to engage a vehicle towing hitch mount 11 which comprises a metal box section having an end opening 12 and a transverse drilling 13 adapted to receive a locking pin 14.

The step apparatus comprises a mounting portion 15 of complementary box section to the end opening 12 and corresponding pin apertures 16 adapted to register with the apertures 13 on insertion of the mounting portion 15 in the opening 12.

Welded to the mounting-portion 15 is a metal step portion 17 having a non-slip textured surface 20.

Figure 2:
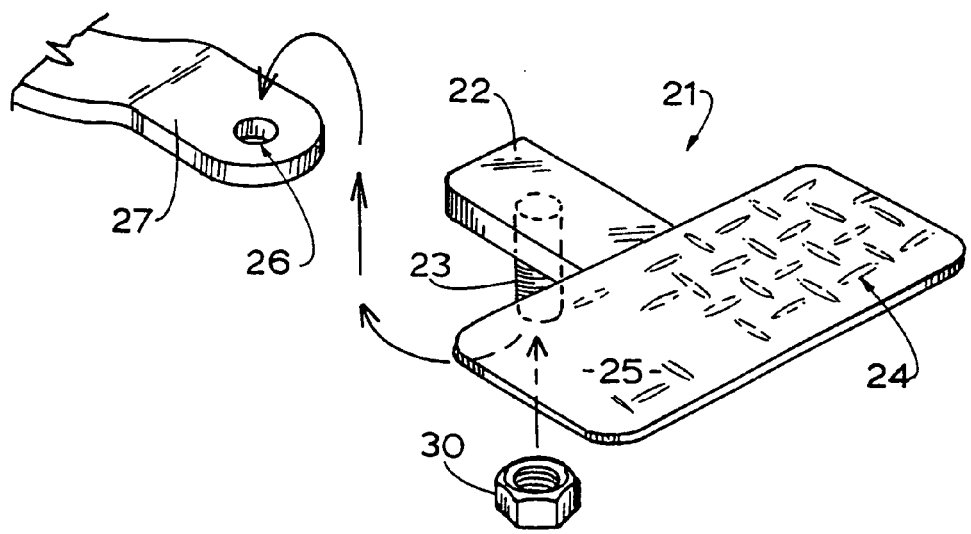
FIG. 2 is an exploded view of alternate apparatus in accordance with the present invention.

In the embodiment illustrated in FIG. 2, alternative step apparatus 21 comprises a mounting portion 22 having downwardly depending threaded stud 23 at the inner end thereof and welded on step portion 24 at the outer end thereof. The step portion 24 is provided with a non-slip upper surface 25. The threaded stud 23 is adapted to engage the hitch ball aperture 26 of a conventional gooseneck 27, and secured in position thereon by virtue of securing nut 30.

Figure 3:
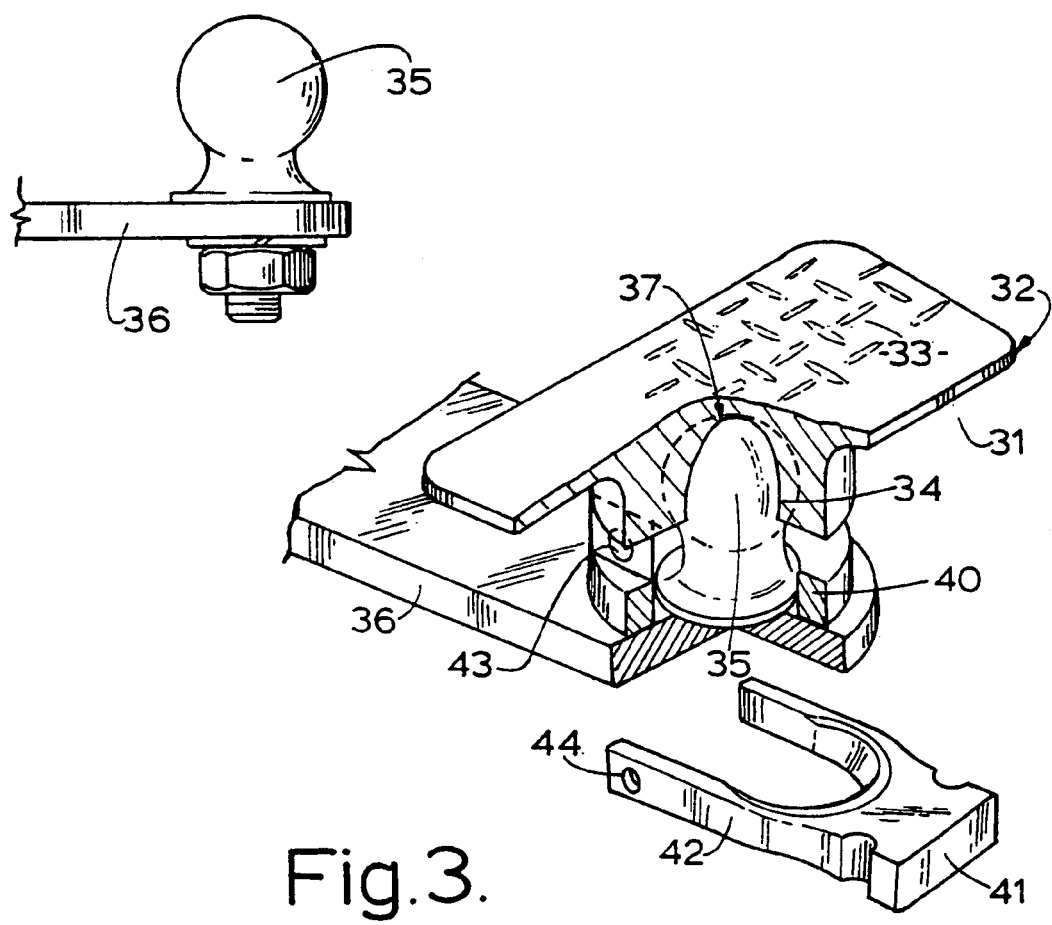
FIG. 3 is an exploded view of yet further alternate embodiment of the present invention.

In the embodiment illustrated in FIG. 3, there is provided step apparatus 31 comprising an integral metal casting having an upper step portion 32 having non-slip surface 33, and integrally formed mounting socket portion 34. The socket portion 34 is adapted to pass over the hitch ball 35 as installed on a conventional gooseneck 36. The socket portion 34 has an upper domed inner surface 37 adapted to receive the spherical upper surface of the hitch ball 35 and a lower substantially cylindrical flange portion 40 adapted to bear on the gooseneck 36. The flange portion 40 is provided with a slot at 41 adapted to receive a locking yoke 42 and is further provided with a locking pin aperture 43 adapted to register with a corresponding locking pin aperture 44 provided through one arm of the locking yoke 42.

Figure 4:
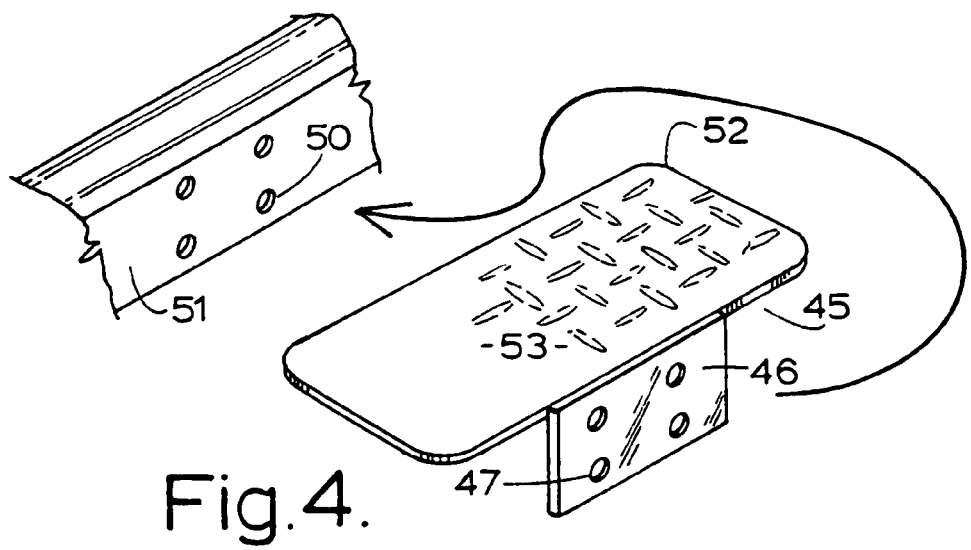
FIG. 4 is an exploded view of yet further alternate embodiment of the present invention.

In the embodiment illustrated in FIG. 4, there is provided step apparatus 45 comprising a mounting portion 46 in the form of a metal plate and provided with a pattern of bolt holes 47 corresponding to the threaded hitch mounting holes 50 provided on a vehicle bumper 51. A step portion 52 is welded to an upper edge of the mounting portion 46 and is provided with a non slip surface 53.

Figure 5:
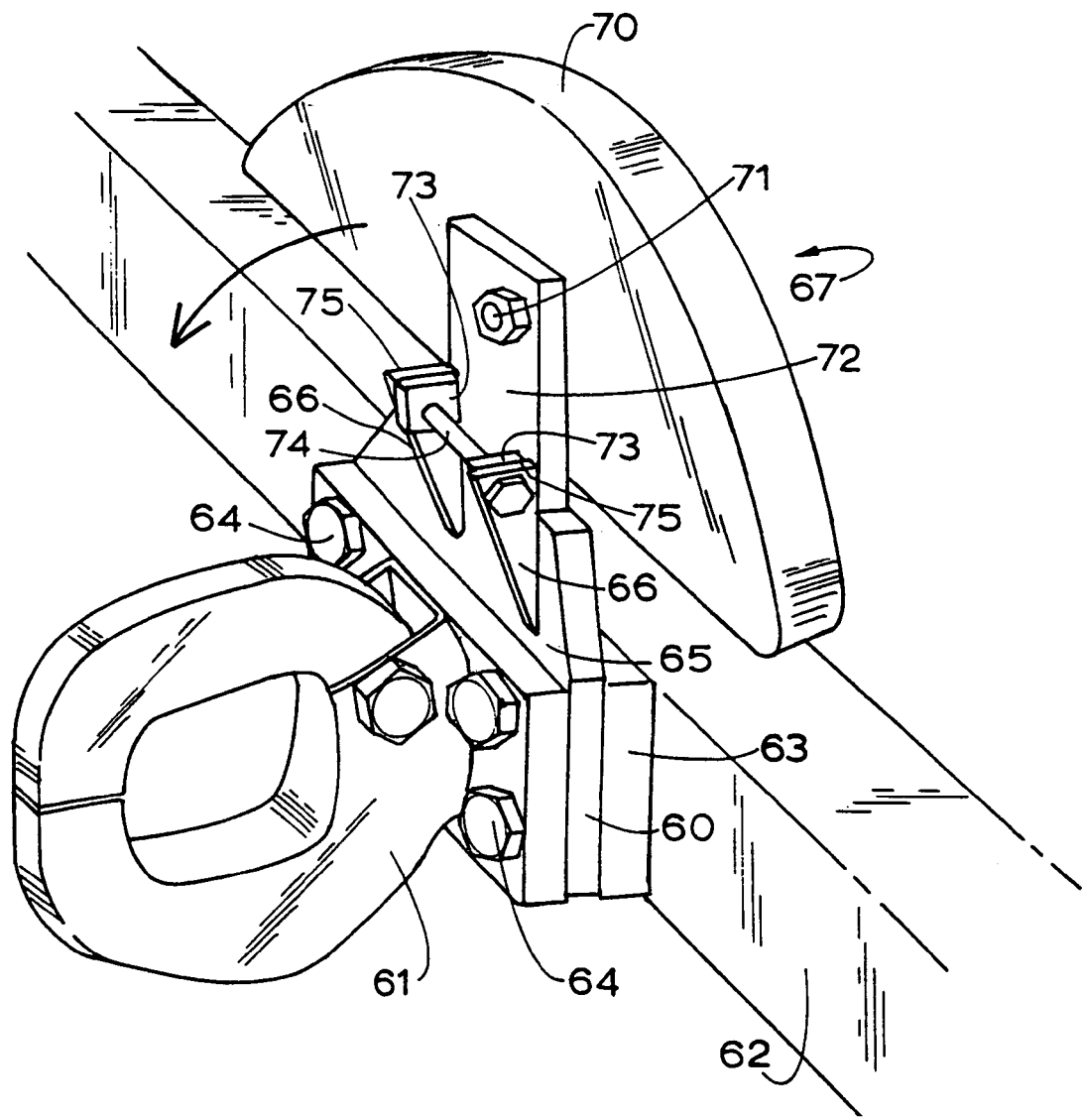
FIG. 5 is a perspective view of a yet further alternate embodiment of the present invention.

In the embodiment of FIG. 5, there is provided step apparatus comprising a mounting plate 60 adapted to be colocated with a pintle hook assembly 61 on a rear member 62 of a vehicle having a mounting pad 63 for the purpose. Threaded holes (not shown) enable the pintle hook assembly 61 and mounting plate 60 to be secured by bolts 64. The mounting plate 60 has an upper extension 65 extending above the mounting pad 63 and having formed thereon a pair of spaced lugs 66 adapted to mount a step assembly 67.

The step assembly 67 comprises a moulded plastic step member 70 secured by nut and bolt assembly 71 to a step member support 72 having a pair of spaced pivot lugs 73, the step assembly being pivotally mounted to the spaced lugs 66 by pivot pin 74. The spaced lugs 66 are configured having an upper bearing surface 75 whereby in use the underside of the step member support 72 may bear thereon to take at least part of the step loads. The dimensions and configuration of the spaced lugs 66, mounting plate 60 and step member support 72 are selected whereby the raising limit of the step assembly 67 is defined by the bearing of the rear edge of the step member support 72 on the upper-edge of the upper extension 65.

Figure 6:
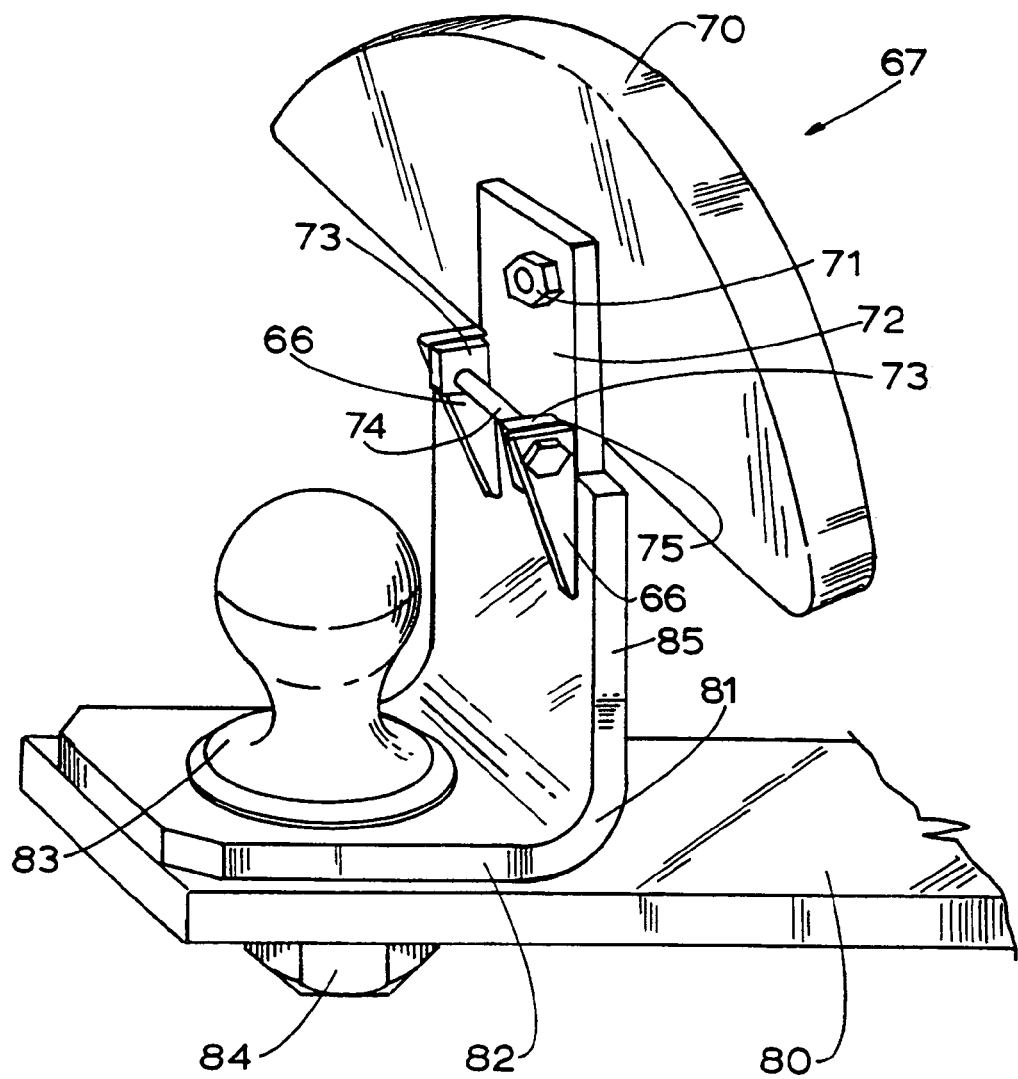
FIG. 6 is a perspective view of yet further alternate embodiment of the present invention.

In the embodiment of FIG. 6, a variation on the embodiment of FIG. 5 is provided with like numerals indicating like components. In this embodiment step apparatus is provided which is adapted to mount to a conventional gooseneck 80. A generally L-shaped mounting member 81 has a lower flange 82 adapted to secured by a hitch ball 83 and nut 84. An upright flange 85 of the mounting member 81 performs the function of the upper extension 65 of FIG. 5.

The embodiments of FIGS. 5 and 6 are particularly suitable for providing a lockable arrangement whereby the step assembly 67 when locked in its deployed position serves to prevent the hitching or unhitching of a towed vehicle. For example, the lugs 73 may be configured to extend down along the inner surface of one or more of the support lugs 66, whereby a drilling through adjacent lugs 73 and support lugs 66 may provide passage for a locking bolt or padlock which retains the step assembly 67 in its deployed position.

A vehicle hitched to the pintle hook 61 or hitch ball 83 respectively could not then be removed until the bolt or padlock is removed and the step assembly 67 moved to its stowed position. Similarly, a hitch could not be made unless the step assembly were unlocked and moved to its stowed position.

It will of course be realised that while the foregoing has been given by way of illustrative example of this invention, all such and other modifications and variations thereto as would be apparent to persons skilled in the art are deemed to fall within the broad scope and ambit of this invention as defined in the claims appended hereto.

The invention claimed is:

1. A step attachment for a trailer hitch having a hitch ball, said hitch having a longitudinal axis and said attachment including:
   a mounting member adapted to be secured to the hitch by the hitch ball stud and having a mounting portion extending in front of the hitch ball, and
   a step hinged to the mounting portion by a pivot pin secured to said mounting portion, whereby the step is pivotable about a horizontal axis transverse to said longitudinal axis, between a deployed position and a stowed position,
   wherein in the deployed position, the step is disposed above the hitch ball and is usable regardless of whether a trailer is mounted on the hitch ball, and
   wherein in the stowed position, the step is forward of the hitch ball.

2. A step attachment as recited in claim 1, further comprising means for locking the step in said deployed position against unauthorized operation thereof.

3. A step attachment as recited in claim 2, wherein the step, in its deployed position, is sufficiently close to the hitch to prevent a trailer tongue mounted on the hitch ball from coming off the hitch ball.

4. A step attachment as recited in claim 1, wherein said mounting portion includes two spaced lugs, wherein the pivot pin is mounted between the lugs, and wherein each lug has an upper bearing surface which is adapted to support the underside of the step when the step is in its deployed position.

* * * * *